United States Patent
Xu et al.

(10) Patent No.: US 8,934,467 B2
(45) Date of Patent: Jan. 13, 2015

(54) RANDOM ACCESS METHOD AND APPARATUS

(75) Inventors: Fangli Xu, Beijing (CN); Yali Zhao, Beijing (CN); Jing Liang, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days.

(21) Appl. No.: 13/990,995

(22) PCT Filed: Dec. 2, 2011

(86) PCT No.: PCT/CN2011/083345
§ 371 (c)(1),
(2), (4) Date: Jun. 10, 2013

(87) PCT Pub. No.: WO2012/072037
PCT Pub. Date: Jun. 7, 2012

(65) Prior Publication Data
US 2013/0250902 A1    Sep. 26, 2013

(30) Foreign Application Priority Data

Dec. 2, 2010   (CN) .......................... 2010 1 0571102

(51) Int. Cl.
| | |
|---|---|
| H04W 4/00 | (2009.01) |
| H04W 74/08 | (2009.01) |
| H04W 74/00 | (2009.01) |
| H04B 7/22 | (2006.01) |
| H04B 7/212 | (2006.01) |
| H04W 36/00 | (2009.01) |

(52) U.S. Cl.
CPC ........ H04W 74/0833 (2013.01); H04W 74/006 (2013.01); *H04W 36/0077* (2013.01)
USPC ............ 370/341; 370/322; 370/329; 370/348

(58) Field of Classification Search
None
See application file for complete search history.

(56) References Cited

U.S. PATENT DOCUMENTS

| 2009/0170498 A1 | 7/2009 | Venkatasubramanian et al. |
| 2011/0075624 A1* | 3/2011 | Papasakellariou et al. ... 370/329 |

(Continued)

FOREIGN PATENT DOCUMENTS

| CN | 101686557 A | 3/2010 |
| CN | 101815344 A | 8/2010 |
| CN | 102036411 A | 4/2011 |

OTHER PUBLICATIONS

Technical Specification, "3rd Generation Part Technical Specification Group Radio Access Network; Evolved Universal Terrestrial Radio Access (E-UTRA); Medium Access Control (MAC) Protocol Specification (Release 9)," *3GPP TS 36.321*, Meeting #71bis, Xian, China, Jun. 2010, vol. 9.3.0, pp. 1-51.

*Primary Examiner* — Ayaz Sheikh
*Assistant Examiner* — Sori Aga
(74) *Attorney, Agent, or Firm* — DLA Piper LLP (US)

(57) ABSTRACT

The invention discloses a random access method and apparatus so as to perform random access for a User Equipment (UE) with a plurality of aggregated cells in a carrier aggregation-enabled LTE-A system. The method includes: determining a secondary cell configured for a UE and obtaining random access related parameter preset for the secondary cell; and sending the random access related parameter to the UE to instruct the UE to initiate random access procedure over the secondary cell corresponding to the random access related parameter. The inventive method achieves the purpose of enabling the UE to be synchronized with the network side by performing random access over a specified cell, having the UE maintain uplink synchronization with the network side in the configured secondary cell and ensuring the overall performance of the system.

16 Claims, 3 Drawing Sheets

(56) References Cited

U.S. PATENT DOCUMENTS

2012/0082107 A1* 4/2012 Ou et al. .................. 370/329

2014/0064250 A1* 3/2014 Wager et al. .................. 370/331

* cited by examiner

RANDOM ACCESS METHOD AND APPARATUS

This application is a U.S. National Stage of International Application No. PCT/CN2011/083345, filed on 2 Dec. 2011, designating the United States and claiming the benefit of Chinese Patent Application No. 201010571102.0, filed with the Chinese Patent Office on Dec. 2, 2010 and entitled "Random Access Method and Apparatus", which is hereby incorporated by reference in its entirety.

FIELD OF THE INVENTION

The present invention relates to the field of communications and particularly to a random access method and apparatus.

BACKGROUND OF THE INVENTION

In the prior art, a higher executive standard, for example, including peak rates of 1 Gbps in the downlink and 500 Mbps in the uplink is defined for a Long Term Evolution-Advanced (LTE-A) system as compared to a Long Term Evolution (LTE) system. Also good compatibility of the LTE-A system with the LTE system is required. Carrier Aggregation (CA) is introduced to the LTE-A system so as to meet the requirements including peak rates improvement, compatibility with the LTE system and full use of spectrum resources.

In CA, an eNB can configure a User Equipment (UE) concurrently with a plurality of cells and enable the plurality of cells to provide the UE concurrently with a data transmission service. In the CA-enabled LTE-A system, carriers corresponding to the respective cells may be consecutive or inconsecutive in the frequency domain, the maximum bandwidth of each carrier is 20 MHz for compatibility with the LTE system, and there is a bandwidth which may be the same or different across the respective carriers.

In the LTE system, there are defined access mechanisms, and random access takes place generally for the following several reasons:

There is an initial access including an access from a Radio Resource Control Idle (RRC_IDLE) status (also referred to an initial access) and Radio Resource Control (RRC) connection reestablishment initiated after a radio link fails;

Random access is required for handover procedure;

A UE in a Radio Resource Control Connected (RRC_CONNECTED) status has downlink data arrival; and A UE in an RRC_CONNECTED status has uplink data arrival.

In the two scenarios with downlink data arrival and a handover, if there is a dedicated preamble, then the UE can perform a contention-free random access, and if there is no dedicated preamble, then the UE can perform a contention random access.

In order to facilitate transmission of uplink data and to send Hybrid Automatic Repeat Request (HARD) feedback information for downlink data, the UE shall maintain uplink synchronization with the eNB. As specified in the LTE system, uplink synchronization with the UE is maintained at the network side. Referring to FIG. 1, when the UE performs random access, the eNB at the network side obtains an initial Timing Advance (TA) from the preamble, the eNB and the UE maintain a Time Alignment Timer (TA Timer or TAT) respectively, the eNB sends a TA command to the UE and starts the TAT, and if the UE can not receive the TA command correctly, then the UE sends a Negative Acknowledgement (NACK) message to the eNB, and the eNB resends a TA command and restarts the TAT a period of time T1 after receiving the NAK, of if the UE receives the TA command correctly, then the UE starts (restarts) the TAT of the UE and sends an Acknowledgement (ACK) message to the eNB, and the eNB restarts the TAT of the eNB upon reception of the ACK message sent from the UE and resents a TA command after a period of time T2, where the eNB considers a specific UE as being synchronized if its TAT for the UE does not expire; and the UE also considers itself as being synchronized as long as the TAT maintained by the UE does not expire.

In the LTE-A system, due to the introduce of CA, the UE has to initiate random access procedure for a plurality of cells in numerous scenarios so as to enable uplink synchronization of the respective cells, and in order for the UE to maintain TAs of the respective cells, the concept of TA group has been introduced where the same TA can be used for granted carriers of cells belonging to the same TA group and there are different TAs for granted carriers of cells belong to different TA groups. The eNB will send well planned TA groups to the UE so that the UE can know which of cells configured for the UE by the eNB belong to the same TA group.

In the prior art, in the LTE-A system, among the plurality of cells configured for the UE, typically one of the cells is a primary cell (pcell) and the other cells are secondary cells (scells). Reference can be made to the implementation schemes of the LTE system to perform random access procedure for the primary cell (pcell), but no relevant procedure has been defined regarding how to initiate random access procedure for the secondary cells (scells) to maintain uplink synchronization with the network side at the respective cells, so further improvements are desirable.

SUMMARY OF THE INVENTION

Embodiments of the invention provide a random access method, apparatus and system so as to enable a UE to perform random access in a secondary cell configured for the UE in carrier aggregation-enabled LTE-A system.

Specific technical solutions according to the embodiments of the invention are as follows:

A random access method includes:

determining a secondary cell configured for a UE and obtaining random access related parameter preset for the secondary cell; and sending the random access related parameter to the UE to instruct the UE to initiate random access procedure over the secondary cell corresponding to the random access related parameter.

A random access method includes:

receiving random access related parameter, sent from network side, preset for a secondary cell configured locally; and initiating random access procedure over the secondary cell corresponding to the random access related parameter.

A random access apparatus includes:

an obtaining unit configured to determine a secondary cell configured for a UE and to obtain random access related parameter preset for the secondary cell; and a communicating unit configured to send the random access related parameter to the UE to instruct the UE to initiate random access procedure over the secondary cell corresponding to the random access related parameter.

A random access apparatus includes:

a communicating unit configured to receive random access related parameter, sent from network side, preset for a secondary cell configured locally; and a processing unit configured to initiate random access procedure over the secondary cell corresponding to the random access related parameter.

In the embodiments of the invention, in an LTE-A system, a mechanism to perform random access procedure is further improved for a plurality of scells configured for a UE so that an eNB determines the scells configured for the UE and sends RA related parameter(s) preset for the scells to the UE, and the UE initiates random access procedure to the eNB over scell(s) corresponding to the obtained RA related parameter (s), thus achieving the purpose of enabling the UE to be synchronized with the network side by performing random access over a specified cell, having the UE maintain uplink synchronization with the network side in the configured scell and ensuring the overall performance of the system.

DETAILED DESCRIPTION OF THE EMBODIMENTS

In a CA-enabled LTE-A system, the invention proposes a method of instructing a UE via RRC signaling to initiate Random Access (RA) procedure considering the situation where the UE may be configured by the network side with respective secondary cells (scells) with different Timing Adjustment (TA) information. Specifically:

A network-side apparatus determines scells configured for the UE, obtains RA related parameter preset for the scells and sends the RA related parameter to the UE to instruct the UE to select one or more scells preset with the RA related parameter among the scells configured by the network side for the UE according to the received RA related parameter to initiate random access procedure. Upon reception of the RA related parameter, sent from the network side, preset for the respective scells configured for the UE, the UE side selects a scell preset with the RA related parameter among locally configured scells according to the RA related parameter to initiate random access procedure. Particularly, the network-side apparatus can preset the RA related parameter for all the scells configured for the UE or can set the RA related parameter for a part of the scells configured for the UE. The locally configured scells of the UE are the scells configured for the UE by the network-side apparatus.

In this embedment, preferably the random access procedure is initiated over the scell for the purpose of maintaining uplink synchronization with the network side, and random access procedure initiated at the UE side for transmission of uplink data may not be performed over the secondary cell.

Preferred embodiments of the invention will be detailed below with reference to the drawings.

Figure 2:
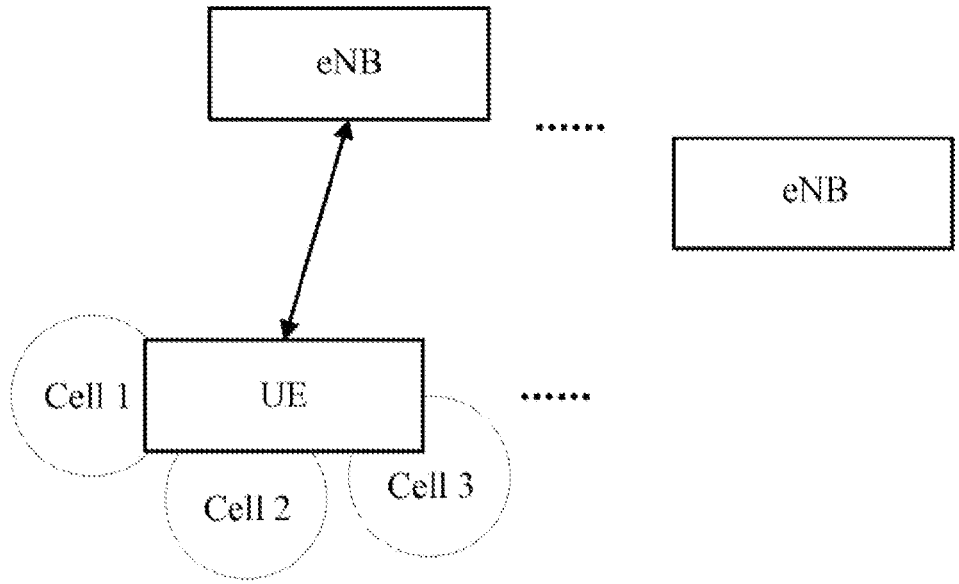
FIG. 2 is a schematic architectural diagram of an LTE-A system according to an embodiment of the invention.
Figure 3:
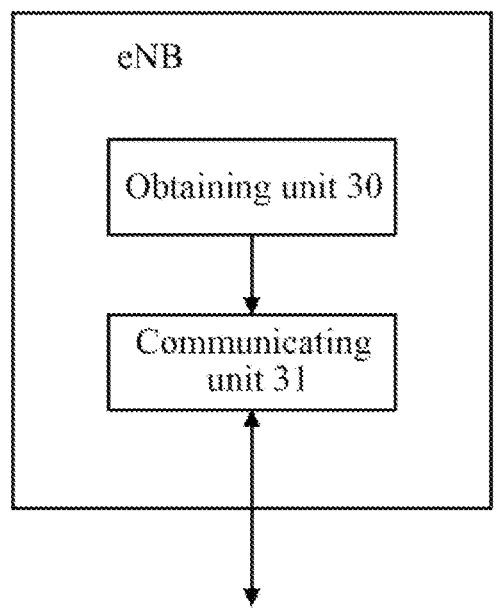
FIG. 3 is a schematic functional structural diagram of an eNB according to an embodiment of the invention.
Figure 4:
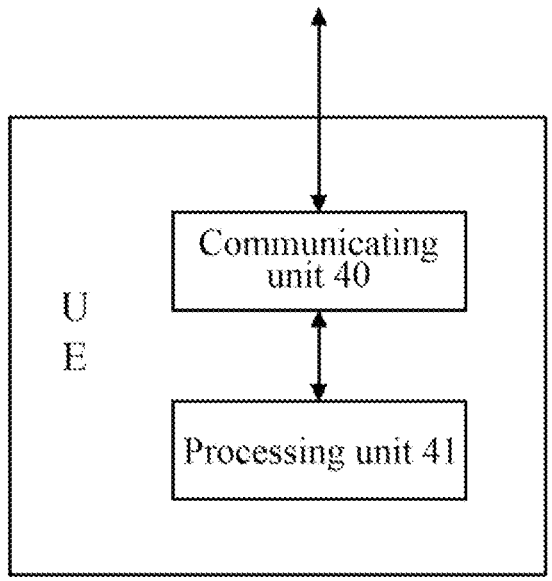
FIG. 4 is a schematic functional structural diagram of a UE according to an embodiment of the invention.

Referring to FIG. 2, FIG. 3 and FIG. 4, in an embodiment of the invention, an LTE-A system includes several eNBs and UEs, where:

An eNB includes an obtaining unit 30 and a communicating unit 31.

The obtaining unit 30 is configured to determine scells configured for a UE and to obtain RA related parameter preset for the scells; and The communicating unit 31 is configured to send the obtained RA related parameter to the UE to instruct the UE to select one or more scells preset with the RA related parameter among the respective scells configured by the network side for the UE according to the received RA related parameter to initiate random access procedure.

A UE includes a communicating unit 40 and a processing unit 41.

The communicating unit 40 is configured to receive RA related parameter, sent from the network side, preset for locally configured scells; and The processing unit 41 is configured to select one or more scells preset with the RA related parameter among the locally configured scells according to the received RA related parameter to initiate random access procedure.

Figure 5:
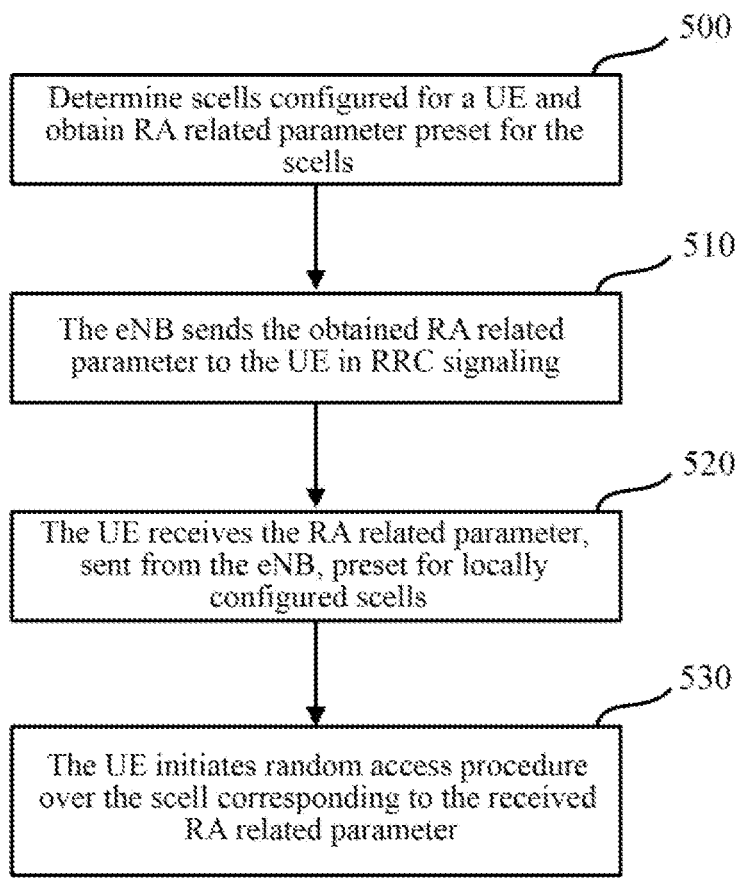
FIG. 5 is a flow chart of an eNB controlling a UE to perform random access according to an embodiment of the invention.

Referring to FIG. 5, in an embodiment of the invention, a detailed flow of an eNB controlling a UE to perform random access is as follows:

Step 500: An eNB determines scells configured for a UE and obtains RA related parameter preset for the scells.

In a practical application, due to the adoption of CA in the system, the UE may be configured with a plurality of cells including a primary cell (pcell) and secondary cells (scells), and since random access procedure of the pcell can be performed referring to the mechanism of the LTE system, the embodiment of the invention will be described primarily for a mechanism to initiate random access procedure over one or more scells.

In this embodiment, the RA related parameter preset at the network side for the scells can include one or any combination of common information element (IE), dedicated information element (IE) and a newly defined IE, where the common IE can be Random Access Channel-Configuration Common Information Element (RACH-ConfigCommon IE) in RRC signaling configuration, the dedicated IE can be Random Access Channel-Configuration Dedicated Information Element (RACH-ConfigDedicated IE) in RRC signaling configuration, and the newly defined IE can be a new IE added in configuration information of a secondary cell to indicate that the UE is allowed to initiate random access procedure over the secondary cell, or this can be indicated by another associated IE.

Step 510: The eNB sends the obtained RA related parameter to the UE in RRC signaling.

In a practical application, preferably the eNB can send the RA related parameter to the UE in an RRC reconfiguration command.

Step 520: The UE receives the RA related parameter, sent from the eNB, preset for locally configured scells.

Step 530: The UE initiates random access procedure over one or more scells corresponding to the received RA related parameter. Random access procedure may be initiated over scells respectively corresponding to each RA related parameter, or random access procedure can be initiated over a scell corresponding to one RA related parameter.

The UE performs the following operations upon reception of the RA related parameter of a specific scell: the status of the scell is set to an active status from being added until the scell is deleted; or the status of the scell is set to an active status immediately after the scell is added, and subsequently the scell is deactivated upon detection of uplink out-of-synchronization of TAT (i.e., TA expiration) of the scell; or the scell configured with the RA related parameter is determined and the scell is in an active status upon initiation of random access procedure, and the scell is deactivated upon detection of uplink out-of-synchronization of TAT of the scell, that is, firstly the status of the scell is set to an active status before random access procedure is initiated and subsequently the scell is deactivated upon detection of uplink out-of-synchronization of TAT (i.e., TA expiration) of the scell, or at least the status of the scell is set to an active status before random access procedure is initiated over the scell and subsequently the scell is deactivated upon detection of uplink out-of-synchronization of TAT (i.e., TA expiration) of the scell. The eNB can instruct the UE to set the status of the scell to an active status or the UE can set on its own initiative the status of the scell to an active status.

Furthermore if a scell belongs to a specific TA group, that is, the same TA information and TAT is used for all the scells included in the TA group, then the UE initiates random access procedure over the scell belonging to the specific TA group and will apply TA information for the scell obtained in the random access procedure to all the cells included in the TA group to which the scell belongs and maintain a TAT of the TA group by the TA information.

Correspondingly, after notifying the UE of the RA related parameter of a specific scell, the eNB can also instruct the UE to set the status of the scell to an active status when the UE adds the scell until the scell is deleted; or can instruct the UE to set the status of the scell to an active status when the UE adds the scell and subsequently instruct the UE to deactivate the scell upon detection of uplink out-of-synchronization of TAT (i.e., TA expiration) of the scell; or can instruct the UE to determine the scell configured with the RA related parameter, to set the secondary cell to an active status upon initiation of random access procedure and to deactivate the scell upon detection of uplink out-of-synchronization of TAT of the scell, that is, the eNB firstly instructs the UE to set the status of the scell to an active status before random access procedure is initiated and subsequently instructs the UE to deactivate the scell upon detection of uplink out-of-synchronization of TAT (i.e., TA expiration) of the scell, or at least instructs the UE to set the status of the scell to an active status upon or before initiation of random access procedure over the scell and subsequently instructs the UE to deactivate the scell upon detection of uplink out-of-synchronization of TAT (i.e., TA expiration) of the scell.

Furthermore if a scell belongs to a specific TA group, then the UE also maintains a TAT for the TA group to which the scell belongs, and the eNB will apply TA information preset for the scell in random access procedure to all the cells included in the TA group to which the scell belongs and maintain the TAT of the TA group by the TA information.

Figure 1:
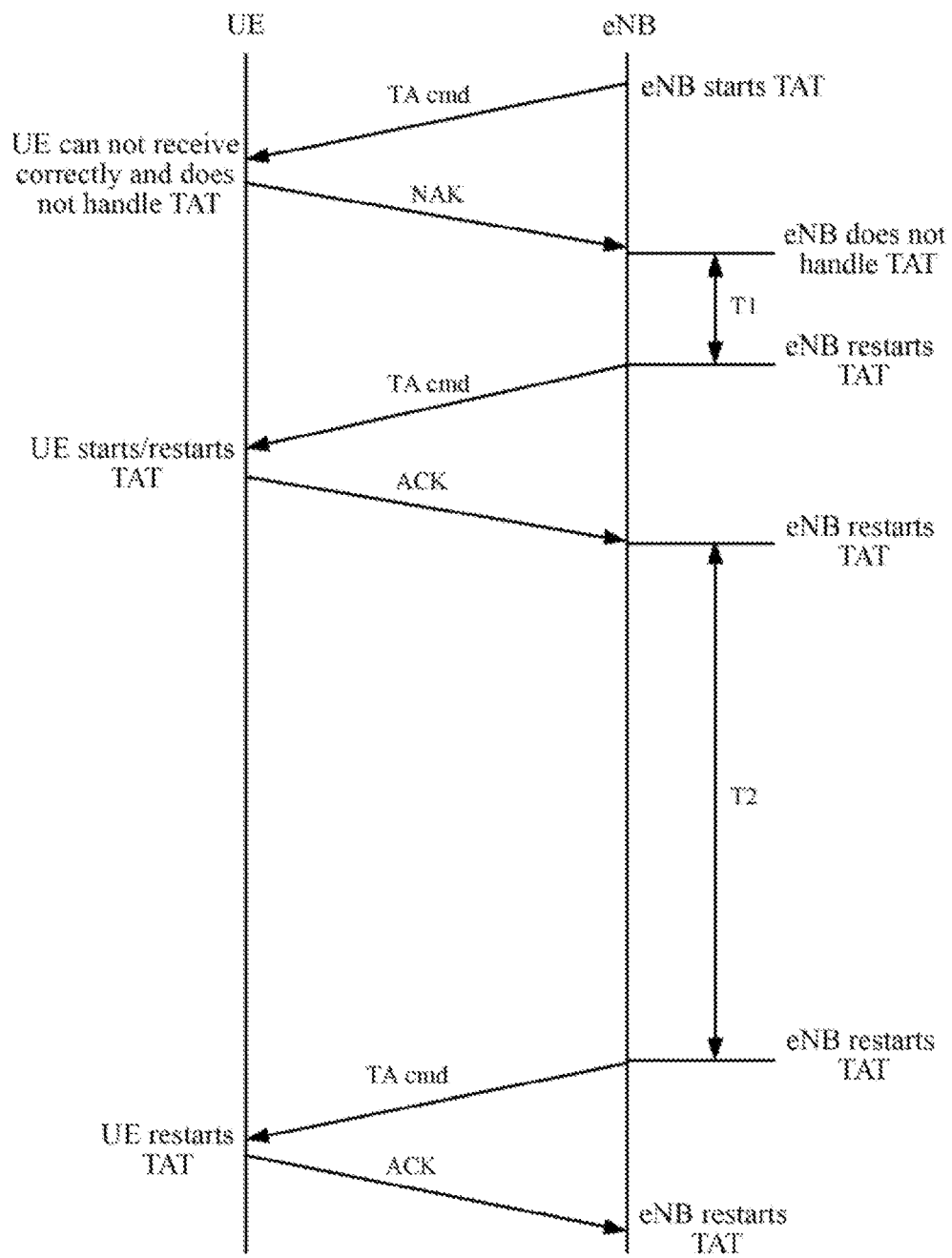
FIG. 1 is a schematic diagram of maintaining uplink synchronization between an eNB and a UE in the prior art.

Thus the UE can maintain uplink synchronization with the network side in the scell over which the random access procedure is initiated, where the network side and the UE side initiate a TAT particularly as illustrated in FIG. 1, and a repeated description thereof will be omitted here.

At the end of the random access procedure, if the eNB subsequently knows uplink out-of-synchronization of TAT over a specific scell, that is, at least one of a TAT established at the UE and a TAT established at the eNB is out of uplink synchronization, then the eNB will initiate random access procedure again over the scell by instructing the UE in Physical Downlink Control Channel signaling (i.e., an PDCCH command) to initiate random access procedure over the scell.

Based upon the foregoing flow, a further description will be given below in four particular embodiments.

In a first scenario:

The eNB configures the UE with two scells, i.e., cell-1 and cell-2, belonging respectively to different TA groups or different frequency bands, where cell-1 is a pcell, and cell-2 is a scell.

The eNB configures the UE with cell-2 by including RA related parameter (e.g., a rach-ConfigCommon IE and a rach-ConfigDedicated IE) in cell configuration information of cell-2 and sends the RA related parameter of cell-2 to the UE in an RRC reconfiguration command.

The UE adds cell-2 upon reception of the RRC reconfiguration command and takes cell-2 as an RA cell and immediately initiates RA procedure over cell-2 with use of the rach-ConfigDedicated IE to obtain uplink synchronization with the network side (a TAT will be established in this process) and also sets cell-2 to an active status.

Upon detection of cell-2's completion of the RA procedure and obtainment of uplink synchronization, the eNB can instruct the UE in a deactivation command to deactivate cell-2.

Upon completion of uplink synchronization, if a TAT maintained by the UE for cell-2 expires, that is, there is out-of-synchronization, then in a subsequent flow, the UE can trigger RA procedure to be initiated again over cell-2 and have cell-2 enter an active status again only upon reception of a PDCCH command sent from the eNB.

In a second scenario:

The eNB configures the UE with two scells, i.e., cell-1 and cell-2, belonging respectively to different TA groups or different frequency bands, where cell-1 is a pcell, and cell-2 is a scell.

The eNB configures the UE with cell-2 by carrying RA related parameter (a rach-ConfigCommon IE) of cell-2 in an RRC reconfiguration command.

The UE adds cell-2 upon reception of the RRC reconfiguration command and takes cell-2 as an RA cell without activating cell-2.

The eNB sends a PDCCH command to the UE, triggers the UE to initiate an RA process over cell-2 and triggers cell-2 to enter an active status.

The UE initiates RA procedure over cell-2 upon reception of the PDCCH command to obtain uplink synchronization with the network side (a TAT will be established in this process) and also sets cell-2 to an active status.

Upon detection of cell-2's completion of the RA procedure and obtainment of uplink synchronization, the eNB can instruct the UE in a deactivation command to deactivate cell-2.

Upon completion of uplink synchronization, if a TAT maintained by the UE for cell-2 expires, that is, there is out-of-synchronization, then in a subsequent flow, the UE can trigger RA procedure to be initiated again over cell-2 and have cell-2 enter an active status again only upon reception of a PDCCH command sent from the eNB.

In a third scenario:

The eNB configures the UE with three scells, i.e., cell-1, cell-2 and cell-3, belonging respectively to different TA groups or different frequency bands, where cell-1 is a pcell, and both cell-2 and cell-3 are scells and belong to the same TA group.

The eNB configures the UE with cell-2 and cell-3 by carrying RA related parameter (a rach-ConfigCommon IE and a rach-ConfigDedicated IE) corresponding to cell-2 but no RA related parameter corresponding to cell-3 in an RRC reconfiguration command.

The UE adds cell-2 and cell-3 upon reception of the RRC reconfiguration command and takes cell-2 as an RA cell and immediately initiates RA procedure over cell-2 with use of the rach-ConfigDedicated IE to obtain uplink synchronization with the network side (a TAT will be established in this process) and also sets cell-2 to an active status; and on the other hand, the UE configures cell-3 as a non-RA cell defaulted to an inactive status and configures cell-2 and cell-3 explicitly or implicitly as a TA group.

The UE maintains uniformly an established TAT for the TA group to which cell-2 and cell-3 belong after obtaining uplink synchronization of cell-2.

Upon detection of cell-2's completion of the RA procedure and obtainment of uplink synchronization, the eNB can instruct the UE in a deactivation command to deactivate cell-2.

Upon completion of uplink synchronization, if the TAT maintained by the UE for cell-2 expires, that is, there is out-of-synchronization, then in a subsequent flow, the UE can trigger RA procedure to be initiated again over cell-2 and have cell-2 enter an active status again only upon reception of a PDCCH command sent from the eNB.

In a fourth scenario:

The eNB configures the UE with three scells, i.e., cell-1, cell-2 and cell-3, belonging respectively to different TA groups or different frequency bands, where cell-1 is a pcell, and both cell-2 and cell-3 are scells and belong to the same TA group.

The eNB configures the UE with cell-2 and cell-3 by including in an RRC reconfiguration command rach-Config-Common IEs in RA related parameters of cell-2 and cell-3 and a rach-ConfigDedicated IE in the RA related parameters of cell-2.

The UE adds cell-2 and cell-3 upon reception of the RRC reconfiguration command and initiates RA procedure over cell-2 by the rach-ConfigDedicated IE to obtain uplink synchronization with the network side (a TAT will be established in this process) and also sets cell-2 to an active status.

The UE maintains uniformly an established TAT for the TA group to which cell-2 and cell-3 belong after obtaining uplink synchronization of cell-2.

Upon detection of cell-2's completion of the RA procedure and obtainment of uplink synchronization, the eNB can instruct the UE in a deactivation command to deactivate cell-2.

The eNB can further instruct the UE in a PDCCH command to initiate RA procedure over cell-2 or cell-3. For example, the UE initiates RA procedure again by over cell-2 or cell-3 corresponding to RA related parameter carried in the PDCCH command to obtain uplink synchronization with the network side and also activates cell-2 or cell-3 over the RA procedure is initiated.

In the embodiments of the invention, in an LTE-A system, a mechanism to perform random access procedure is further improved for a plurality of scells configured by the network side for a UE so that an eNB determines the scells configured for the UE and sends RA related parameter preset for the scells to the UE, and the UE initiates random access procedure to the eNB over a corresponding scell according to the obtained RA related parameter, thus achieving the purpose of enabling the UE to be synchronized with the network side by performing random access over a specified cell, having the UE maintain uplink synchronization with the network side in the configured scell and ensuring the overall performance of the system.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A random access method, comprising:
   determining a secondary cell configured for a UE and obtaining random access related parameter preset for the secondary cell; and
   sending the random access related parameter to the UE to instruct the UE to initiate random access procedure over the secondary cell corresponding to the random access related parameter,
   wherein sending the random access related parameter to the UP to instruct the UE to initiate the random access procedure over the secondary cell corresponding to the random access related parameter comprises:
   instructing the UE to initiate the random access procedure over the secondary cell corresponding to the random access related parameter immediately after sending the random access related parameter to the UE; or
   sending a physical downlink control channel command to the UE after sending the random access related parameter to the UE to instruct the UE to initiate the random access procedure over the secondary cell corresponding to the random access related parameter;
   wherein, if the secondary cell is detected to belong to a Timing Advance (TA) group, applying Timing Advance (TA) information preset for the secondary cell in the random access procedure to all cells comprised in the TA group, and maintaining a Time Alignment Timer (TAT) of the TA group with use of the TA information.

2. The method according to claim 1, wherein the random access related parameter comprises one or any combination of common information element, dedicated information element and newly defined information element for indicating that the UE is allowed to initiate random access procedure over the secondary cell corresponding to the newly defined information element.

3. The method according to claim 1, wherein the method further comprises: instructing the UE to determine the secondary cell configured with the random access related parameter and to set the secondary cell to be in an active status all the time from being added until being deleted; or the method further comprises: instructing the UE to determine the secondary cell configured with the random access related parameter, to set the secondary cell to an active status immediately after being added, and to deactivate the secondary cell upon detection of uplink out-of-synchronization of Time Alignment Timer (TAT) of the secondary cell; or the method further comprises: instructing the UE to determine the secondary cell configured with the random access related parameter, to set the secondary cell to an active status before random access is initiated, and to deactivate the secondary cell upon detection of uplink out-of-synchronization of TAT of the secondary cell.

4. The method according to claim 3, wherein if uplink out-of-synchronization of TAT of the secondary cell is detected and the UE is instructed to deactivate the secondary cell, then the method further comprises the step of instructing the UE in physical downlink control channel signaling to initiate random access procedure over the secondary cell.

5. The method according to claim 2, wherein the method further comprises: instructing the UE to determine the secondary cell configured with the random access related parameter and to set the secondary cell to be in an active status all the time from being added until being deleted; or the method further comprises: instructing the UE to determine the secondary cell configured with the random access related parameter, to set the secondary cell to an active status immediately after being added, and to deactivate the secondary cell upon detection of uplink out-of-synchronization of Time Alignment Timer (TAT) of the secondary cell; or the method further comprises: instructing the UE to determine the secondary cell configured with the random access related parameter, to set the secondary cell to an active status before random access is initiated, and to deactivate the secondary cell upon detection of uplink out-of-synchronization of TAT of the secondary cell.

6. A random access method, comprising:

receiving random access related parameter, sent from network side, preset for a secondary cell configured locally; and initiating random access procedure over the secondary cell corresponding to the random access related parameter, wherein initiating random access procedure over the secondary cell corresponding to the random access related parameter comprises;

initiating random access procedure over the secondary cell corresponding to the random access related parameter immediately upon reception of the random access related parameter; or initiating the random access procedure over the secondary cell corresponding to the random access related parameter upon reception of a physical downlink control channel command after receiving the random access related parameter:

wherein, if the secondary cell is detected to belong to a Timing Advance (TAT) group, then applying Timing Advance (TA) information obtained by the secondary cell in the random access procedure to all cells comprised in the TA group, and maintaining a Time Alignment Timer (TAT) of the TA group with use of the TA information.

7. The method according to claim 6, wherein the random access related parameter comprises one or any combination of common information element, dedicated information element and newly defined information element for indicating that the UE is allowed to initiate random access procedure over the secondary cell corresponding to the newly defined information element.

8. The method according to claim 6, wherein the method further comprises: determining the secondary cell configured with the random access related parameter and setting the secondary cell to be in an active status all the time from being added until being deleted; or the method further comprises: determining the secondary cell configured with the random access related parameter, setting the secondary cell to an active status immediately after being added, and deactivating the secondary cell upon detection of uplink out-of-synchronization of Time Alignment Timer (TAT) of the secondary cell; or the method further comprises: determining the secondary cell configured with the random access related parameter, setting the secondary cell to an active status before random access is initiated, and deactivating the secondary cell upon detection of uplink out-of-synchronization of TAT of the secondary cell.

9. The method according to claim 8, wherein if uplink out-of-synchronization of TAT of the secondary cell is detected and the secondary cell is deactivated, then the method further comprises the step of initiating random access procedure over the secondary cell upon reception of physical downlink control channel signaling.

10. The method according to claim 7, wherein the method further comprises:

determining the secondary cell configured with the random access related parameter and setting the secondary cell to he in an active status all the time from being added until being deleted; or determining the secondary cell configured with the random access related parameter, setting the secondary cell to an active status immediately after being added, and deactivating the secondary cell upon detection of uplink out-of-synchronization of Time Alignment Timer (TAT) of the secondary cell; or determining the secondary cell configured with the random access related parameter, setting the secondary cell to an active status before random access is initiated, and deactivating the secondary cell upon detection of uplink out-of-synchronization of TAT of the secondary cell.

11. A random access apparatus, comprising:

an obtaining unit configured to determine a secondary cell configured for a UE and to obtain random access related parameter preset for the secondary cell; and a communicating unit configured to send the random access related parameter to the UE to instruct the UE to initiate random access procedure over the secondary cell corresponding to the random access related parameter, wherein the communicating unit instructs the UE to initiate the random access procedure over the secondary cell corresponding to the random access related parameter immediately after sending the random access related parameter to the UE; or sends a physical downlink control channel command to the UE after sending the random access related parameter to the UE to instruct the UE to initiate the random access procedure over the secondary cell corresponding to the random access related parameter;

wherein, if the secondary cell is detected to belong to a Timing Advance (TA) group, then the communicating unit applies Timing Advance (TA) information preset for the secondary cell in the random access procedure to all the cells comprised in the TA group, and maintains a Time Alignment Timer (TAT) of the TA group with use of the TA information.

12. The apparatus according to claim 11, wherein the communicating unit instructs the UE to determine the secondary cell configured with the random access related parameter and to set the secondary cell to be in an active status all the time from being added until being deleted; or the communicating unit instructs the UE to determine the secondary cell configured with the random access related parameter, to set the secondary cell to an active status immediately after being added, and to deactivate the secondary cell upon detection of uplink out-of-synchronization of Time Alignment Timer (TAT) of the secondary cell; or the communicating unit instructs the UE to determine the secondary cell configured with the random access related parameter, to set the secondary cell to an active status before random access is initiated, and to deactivate the secondary cell upon detection of uplink out-of-synchronization of TAT of the secondary cell.

13. The apparatus according to claim 12, wherein if uplink out-of-synchronization of TAT of the secondary cell is detected and the UE is instructed to deactivate the secondary cell, then the communicating unit instructs the UE in physical downlink control channel signaling in a subsequent flow to initiate the random access procedure over the secondary cell.

14. A random access apparatus, comprising:
a communicating unit configured to receive random access related parameter, sent from network side, preset for a secondary cell configured locally; and
a processing unit configured to initiate random access procedure over the secondary cell corresponding to the random access related parameter, wherein the processing unit initiates the random access procedure over the secondary cell corresponding to the random access related parameter immediately after the communicating unit receives the random access related parameter; or the processing unit initiates the random access procedure over the secondary cell corresponding to the random access related parameter when the communicating unit receives a physical downlink control channel command after receiving the random access related parameter;

wherein, if the communicating unit detects the secondary cell to belong to a Timing Advance (TA) group, then the processing unit applies Timing Advance (TA) information obtained by the secondary cell in the random access procedure to all the cells comprised in the TA group, and maintains a Time Alignment Timer (TAT) of the TA group with use of the TA information.

15. The apparatus according to claim 14, wherein the communicating unit determines the secondary cell configured with the random access related parameter and set the secondary cell to be in an active status all the time from being added until being deleted; or the communicating unit determines the secondary cell configured with the random access related parameter, sets the secondary cell to an active status immediately after being added, and deactivates the secondary cell upon detection of uplink out-of-synchronization of Time Alignment Timer (TAT) of the secondary cell; or the communicating unit determines the secondary cell configured with the random access related parameter, sets the secondary cell to an active status before random access is initiated, and deactivates the secondary cell upon detection of uplink out-of-synchronization of TAT of the secondary cell.

16. The apparatus according to claim 15, wherein if the communicating unit detects uplink out-of-synchronization of TAT of the secondary cell and deactivates the secondary cell, then the processing unit initiates random access procedure over the secondary cell upon reception of physical downlink control channel signaling in a subsequent flow.

* * * * *